Figure 1:
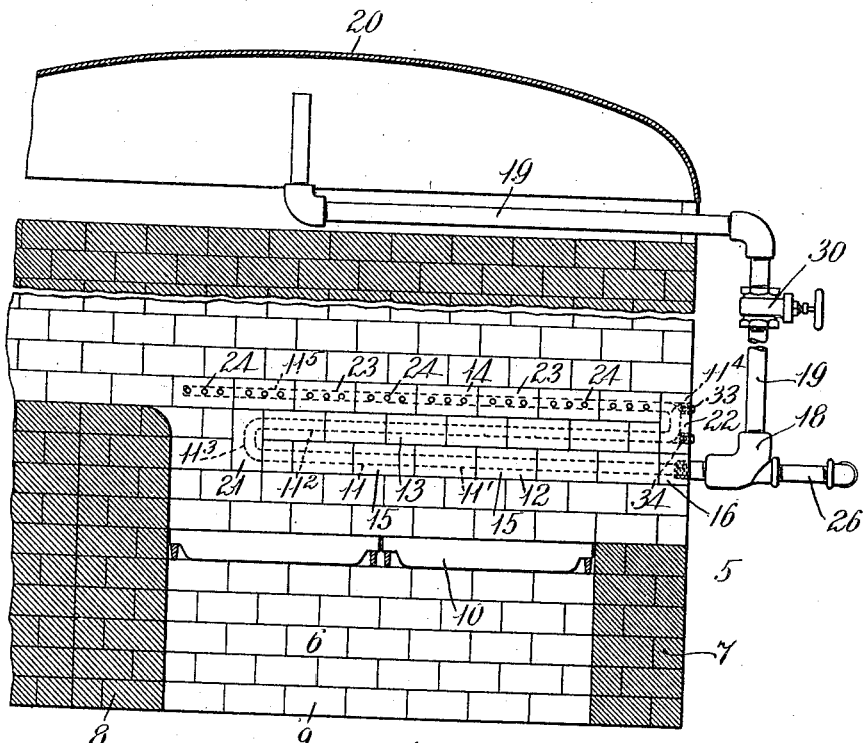

J. B. BARTICK.
FURNACE.
APPLICATION FILED JUNE 24, 1909.

976,249.

Patented Nov. 22, 1910.

Witnesses:
Franklin E. Low
Sydney E. Taft

Inventor:
John B. Bartick
by his attorney
Charles S. Gooding.

UNITED STATES PATENT OFFICE.

JOHN B. BARTICK, OF BOSTON, MASSACHUSETTS.

FURNACE.

976,249.   Specification of Letters Patent.   Patented Nov. 22, 1910.

Application filed June 24, 1909. Serial No. 503,994.

*To all whom it may concern:*

Be it known that I, JOHN B. BARTICK, a citizen of the United States, residing at Boston, in the county of Suffolk and State of Massachusetts, have invented new and useful Improvements in Furnaces, of which the following is a specification.

This invention relates to an improved furnace, especially adapted to be used in connection with boilers, the object of the invention being to provide an inexpensive and practicable means for introducing hot air to the fire-box of the furnace in order to aid in complete combustion of the volatile gases given off from bituminous and semi-bituminous coal burned therein.

The object of the invention is to aid in the combustion of the gases and thus to improve the efficiency of the furnace and prevent the smoke from being discharged through the chimney, which, as is well known, is a nuisance, and in many localities make it impossible, on account of the laws of the community in which the furnace is located, for soft coal to be burned.

In furnaces in which bituminous or semi-bituminous coal is burned, a large percentage of volatile matter is given off as well as fixed carbon, and in order to completely burn this volatile matter and to secure the greatest efficiency from the fuel used, it is very necessary to secure as complete combustion of the fuel as possible, and in order to secure this very desirable result, it is necessary that there should be a sufficient supply of air which must be thoroughly mixed with the gases or volatile matter before referred to, and it is also very important that the temperature of the air and of the combustible gases should be high enough to secure their ignition and perfect combustion, in the fire-box and before these gases mixed with the air come into contact with the cooler portions of the boiler.

In order to secure the results hereinbefore set forth I have embodied in the furnace, adjacent to the fire-box and above the grate, and preferably in the side walls of said furnace, a tortuous passage or hot air flue which extends through the body of the bricks themselves—that is, the fire bricks immediately adjacent to the interior of the fire-box. The air is led into the passage, preferably by means of a pipe extending upwardly above the boiler, so that said air is taken from the hottest part of the room in which the boiler may be located. Then this air is forced by suitable means into the air passages or flues located within the fire bricks in the side walls of the furnace and is finally discharged through openings in the upper course of bricks in which said air flue is located into the fire-box above the grate and above the fuel located thereon. By this arrangement and construction of the side walls of the furnace, the air at a high temperature is forced in among the volatile gases which are given off by the fuel and thus secure a very perfect combustion, the hot air intermingling with said gases at a high temperature sufficient to cause ignition and thus getting a large amount of heat from the combustion of the gases and doing away with the smoke nuisance.

My invention is applicable to old furnaces as well as new, and this is a great advantage, for the same may be introduced into an old furnace by removing a few courses of bricks from the side walls adjacent to the fire-box and inserting in their place a like number of courses of fire bricks constructed in accordance with my invention, all as hereinafter more fully set forth.

The invention consists in a furnace comprising in its construction a side wall, a portion of which wall adjacent to and above the grate of the furnace, is formed by a plurality of bricks, each of these bricks having an air passage extending therethrough, and forming, as a whole, a hot air flue, the outlet or outlets from which pass out of the side wall above the grate of the furnace, and the inlet to said hot air flue communicating with the air outside the furnace.

Figure 2:
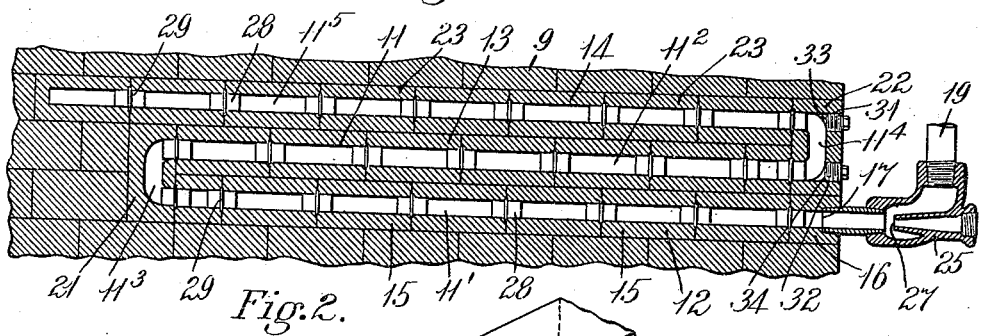
Figure 3:
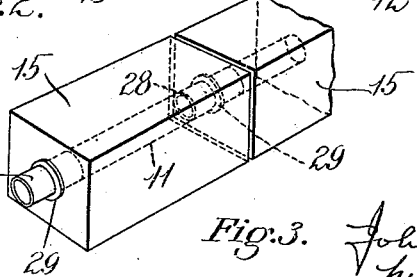

Referring to the drawings: Figure 1 is a longitudinal section of a portion of a furnace adapted to be used as a boiler setting and illustrating my improved construction for supplying hot air to the fire-box of said furnace. Fig. 2 is an enlarged vertical longitudinal section taken through the hot air flue. Fig. 3 is a perspective view of two bricks in the upper course of the bricks which contain the hot air flue, showing the same as they are to be placed together in the operation of laying the same.

Like numerals refer to like parts throughout the several views of the drawings.

In the drawings, 5 is the furnace, 6 the fire-box, 7 the front wall, 8 the rear wall, 9 one of the side walls and 10 the grate. The hot air flue 11 is preferably duplicated in the opposite side walls of the furnace and as will be seen by reference particularly to Figs. 1 and 2, said hot air flue is formed by a plurality of courses of bricks 12, 13 and 14 located on the inside face of the side wall of the furnace and above the grate 10.

The course of bricks 12 consists of a plurality of bricks 15, 15, each of which has an air passage 11' extending therethrough. The outermost brick 16 has an inlet orifice 17 which is preferably connected by an elbow 18 to a vertical pipe 19 which extends upwardly from the outlet 17 to a point preferably located above the boiler. The pipe 19 terminates, preferably, within a hood 20 which is placed above the furnace 5 and is utilized to collect the hot air which has to pass through the pipe 19 and from thence through the hot air flue 11 and into the fire-box above the grate 10. To regulate the amount of air which passes through the pipe 19 to the air flue, a valve 30 is provided.

The course of bricks 13 is made up of bricks which are similar to those used in the course 12, that is, they have an air passage $11^2$ extending therethrough, and when placed end to end these air passages form a portion of the whole hot air flue 11. The air passages 11' and $11^2$ are connected at their inner ends by an air passage $11^3$ which is formed in the brick 21. It will be noted that the air passage $11^3$ enters and leaves the brick 21 upon the same face thereof and the upper opening of said passage $11^3$ alines with the air passage $11^2$ while the lower opening of said passage $11^3$ alines with the passage 11'. Another brick 22 has an air passage $11^4$ therein, which connects the air passage $11^2$ in the second course of bricks with the air passage $11^5$ in the course of bricks 14.

The course of bricks 14 is made up of bricks 23, 23 which not only have a passage $11^5$ extending longitudinally therethrough, but are also provided with outlet passages 24, 24 extending from the passage $11^5$ into the fire-box above the grate. These openings form outlets through which the air which has passed through the air flue 11 as a whole is discharged in the space above the grate. The air may be forced through the air flue 11 by any suitable means, but preferably the same is forced therethrough by an ejector 25 which is connected by a pipe 26 to any suitable source of steam supply, the outlet orifice 27 of said ejector opening into the interior of the elbow 18. The discharge of the steam within said elbow draws the air downwardly through the pipe 19 and forces the same through the hot air flue and through the different passages constituting a portion of said hot air flue, viz., 11', $11^3$, $11^2$, $11^4$ and $11^5$ and outwardly into the space above the grate through the outlet openings 24, 24 in the upper course of bricks 14.

In applying my invention to the walls of an old furnace, it will be readily seen that all that is necessary to be done is to remove the old fire-brick and lay these new fire brick constructed in accordance with my invention in their place.

While I have described my invention as having three courses of bricks, it is evident that the number of courses of bricks may be increased or diminished without departing from the spirit of my invention.

In laying the brick it will be evident that unless some provision is made, the cement which is used is very liable to enter the air passages in the different bricks and thus plug up the air flue, and to prevent this I employ the hereinafter described method of constructing the furnace wall. I provide sleeves 28, 28, which are preferably cylindrical in form and also each sleeve is preferably provided with an annular flange 29 which projects outwardly therefrom and between the faces of two adjacent bricks. In laying the brick the mason places the sleeve with one end thereof projecting into the air passage of one brick, then applies the mortar, lays the brick, and then takes the brick which has to be placed adjacent to the first brick and pushes the same up to the brick first laid, being careful that the projecting end of the sleeve shall enter the passage in the brick which he is at that time laying, and then settles the same into position in the cement which he has previously applied to the brick below. In this way the bricks can be laid without getting any cement into the air passage, and preferably the sleeves are formed of inflammable material or material which will disintegrate upon the application of heat, so that after the fire is once built in the furnace these sleeves will be consumed and leave the air passages of the same internal diameter throughout the entire hot air flue.

While I prefer to construct the sleeves 28, 28 of some inflammable material or materials which will disintegrate upon the application of heat, I do not wish to be understood as limiting my invention to such a construction, as the said sleeves may be constructed of any suitable material which is not inflammable or will not disintegrate upon the application of heat.

In order to clean out the lowermost passage 11', the elbow 18 is removed and a suitable cleaning rod is inserted to clean out said passage. In order to clean out the passages $11^2$ and $11^5$, the outermost brick 22 is provided with transverse passages 31, 32, the passage 31 being in alinement with the passage $11^5$ and the passage 32 being in alinement with the passage $11^2$. These passages are closed when the device is in operation by means of plugs 33 and 34, respectively.

The general operation of the device hereinbefore specifically described is as follows: The valve 30 having been opened steam is subsequently admitted into the passage 11' through the pipe 26 and ejector 25 which draws the air downwardly from the upper end of the pipe 19 and from beneath the hood 20 and forces the same in a manner well known to those skilled in the art through the passages constituting the air flue 11 and outwardly through the outlet openings 24, 24 in the space above the grate. As soon as the fire has been started and the bricks forming the side walls heated, then the air which passes through said bricks also becomes heated to a high temperature and is forced outwardly and mixed thoroughly with the volatile gases which are distilled from the fresh coal placed upon the fire. Thus a very perfect combustion is secured and the smoke nuisance done away with.

Having thus described my invention, what I claim and desire by Letters Patent to secure is:

1. A furnace comprising in its construction a side wall, a portion of which wall adjacent to and above the grate of said furnace is formed by a plurality of courses of bricks, each of said bricks in said courses having an air passage extending therethrough and connecting with the passage in a brick adjacent thereto, said air passages forming, as a whole, a tortuous air flue extending longitudinally of said courses of bricks, and a brick with a passage extending longitudinally therethrough and connecting at its opposite ends, respectively, with said passages in said courses of bricks, said brick having also two clean-out passages extending transversely thereof in alinement, respectively, with said air passages in said courses of bricks, and plugs to close said clean-out passages.

2. A furnace comprising in its construction a side wall, a portion of which wall adjacent to and above the grate of said furnace is formed by a plurality of bricks, each of said bricks having an air passage extending therethrough and connecting with the passage in a brick adjacent thereto, said air passages forming, as a whole, an air flue, and a series of sleeves in said air flue each sleeve connecting two adjacent bricks together.

3. A furnace comprising in its construction a side wall, a portion of which wall adjacent to and above the grate of said furnace is formed by a plurality of bricks, each of said bricks having an air passage extending therethrough and connecting with the passage in a brick adjacent thereto, said air passages forming, as a whole, an air flue, and sleeves in said air flue connecting adjacent bricks together, each having a flange projecting outwardly therefrom between said adjacent bricks.

In testimony whereof I have hereunto set my hand in presence of two subscribing witnesses.

JOHN B. BARTICK.

Witnesses:
CHARLES S. GOODING,
LOUIS A. JONES.